Nov. 13, 1962     E. R. LANG     3,064,247

ELECTRICAL MEASURING APPARATUS

Filed March 8, 1957     3 Sheets-Sheet 1

*INVENTOR.*
ELLIOT R. LANG
BY
ATTORNEY.

Nov. 13, 1962      E. R. LANG      3,064,247

ELECTRICAL MEASURING APPARATUS

Filed March 8, 1957      3 Sheets-Sheet 3

INVENTOR.
ELLIOT R. LANG

BY Arthur H. Swanson

ATTORNEY.

United States Patent Office 3,064,247
Patented Nov. 13, 1962

3,064,247
ELECTRICAL MEASURING APPARATUS
Elliot R. Lang, Pennsauken, N.J., assignor to Minneapolis-Honeywell Regulator Company, Minneapolis, Minn., a corporation of Delaware
Filed Mar. 8, 1957, Ser. No. 644,863
12 Claims. (Cl. 340—347)

The present invention pertains to electrical measuring apparatus of the type adapted to provide a digital representation of the measured quantity. More specifically, the present invention is concerned with that class of digital measuring apparatus which operates on the principle of comparison encoding.

A general object of the present invention is to provide a new and improved measuring apparatus of the class described which is characterized by reliability and simplicity.

A specific object of the present invention is to provide new and improved circuitry for performing the logic necessary to provide a digital representation of the magnitude of an unknown signal by means of comparison encoding.

In comparison encoding systems, the unknown signal is first compared with a signal representing a coded percentage of the highest value that could occur within the range of signals being measured. If the first comparison signal exceeds the unknown signal, it is discarded. If the first comparison signal is less than the unknown signal, it is accepted and subtracted from the unknown signal. At the next comparison stage, the signal resulting from the first comparison, that is, the unknown signal, or the difference between the unknown signal and the first comparison signal, is compared with a second comparison signal representing a lower coded percentage of the highest value that could occur within the range of the signals to be measured. This second comparison signal is rejected or accepted, respectively, depending upon whether or not it exceeds or is less than the signal resulting from the first comparison. This process of comparisons is continued with successive comparison voltages each successively representing a smaller coded percentage of the highest value which could occur within the range of signals being measured. To enable the translation of these comparisons into a digital representation of the quantity being measured, each of the comparison signals corresponds in magnitude with the successive digital positions in a known decimally coded binary number system. Because of the binary number system employed, four comparisons are necessary to provide a coded indication which can be translated into one decimal digit, eight comparisons are necessary to provide a signal that can be translated into two decimal digits, twelve comparisons are necessary to provide a coded indication which can be translated into three decimal digits and so on. Thus, four comparisons are required for each decimal digit translated.

Another specific object of the present invention is to provide new and improved circuitry for accomplishing the rejection and acceptance of comparison signals in a comparison encoding system.

Still another object of the present invention is to provide a comparison encoding system which employs circuitry permitting the maximum degree of independence between the measuring circuit and the logic circuit thereby permitting the use of more reliable components and permitting greater freedom from the tendency for extraneous signals to be introduced into the measuring.

A further object of the present invention is to provide a logic circuit for comparison encoding systems which is characterized by flexibility in performing functions other than its logical function.

Another further object of the present invention is to provide in digital measuring apparatus of the type described, independently adjustable span, suppression, and zero adjustments adapted for discrete digital manipulation.

A still further object of the present invention is to provide an analog to digital converter which is adapted to initiate a readout of each digit of the signal being digitized as the conversion of each digit is completed. In this manner, the analog to digital converter of the present invention is adapted to achieve continuous and more rapid conversions.

The various objects of the present invention are accomplished by a system which provides a pair of successively operated contacts for each comparison to be made, there being as many comparisons as may be required to digitize the signal being measured to the desired degree of accuracy. The operation of the first of these contacts is effective to cause a comparison to be made. The operation of the second of these contacts is effective to cause the acceptance or rejection of the associated comparison signal, depending upon whether or not the signal being measured exceeds or is less than the associated comparison signal. Means are provided for successively operating the pair of contacts associated with each of the comparison voltages in a sequence in accordance with the digital positions in a decimally coded binary number system.

A better understanding of the present invention may be had from the following description read with reference to the accompanying drawings of which.

Figures 1, 2:
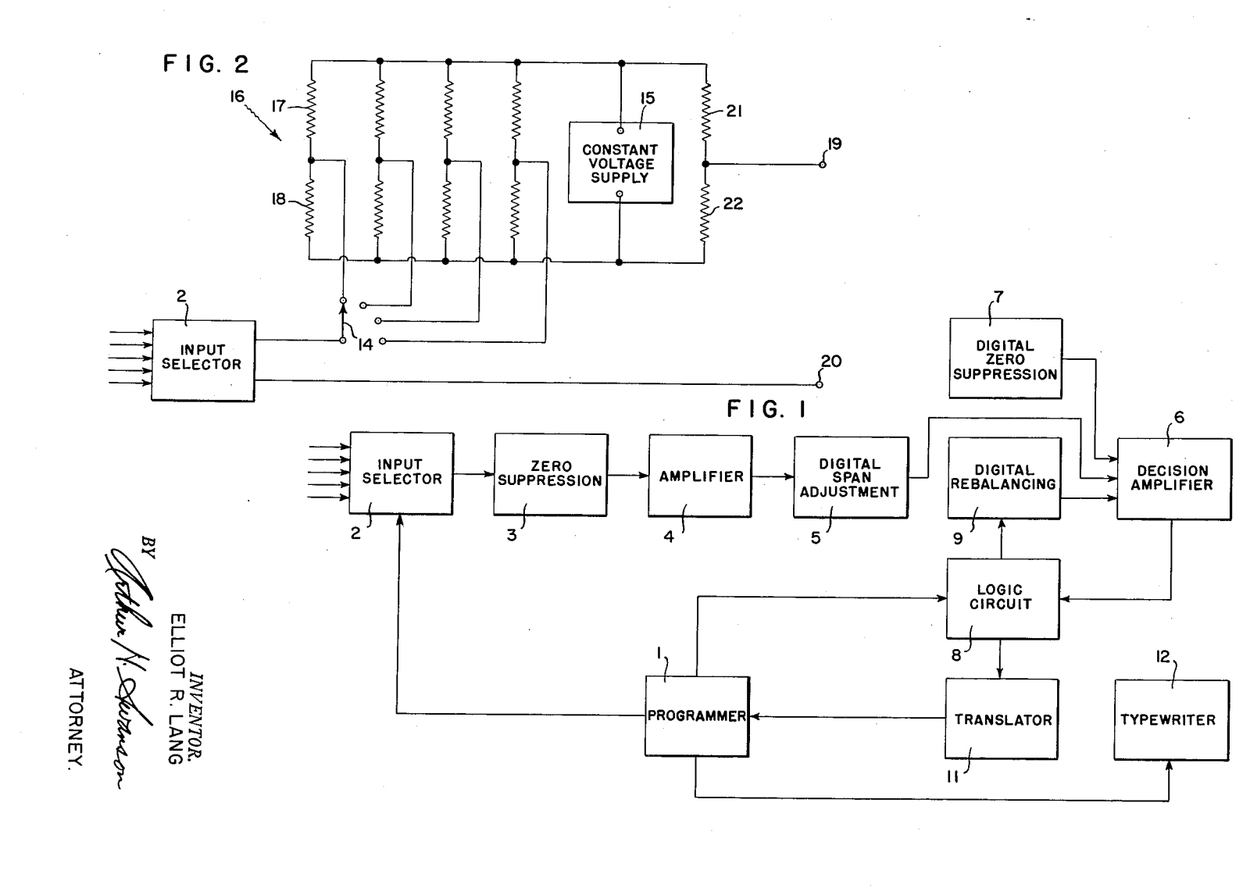
FIG. 1 is a block diagram of the present invention utilized in a data reduction system.
FIG. 2 is a circuit diagram of the zero suppression circuit utilized in the system shown in FIG. 1.

Referring now to FIG. 1, there is shown a block diagram of a data reduction system which is operative to produce a printed record of the values of a plurality of variable signals and which utilizes the present invention. The variable signals recorded may be indicative of the magnitude of a condition or the state of a process as produced by transducers responsive to the condition or state of the process. Any number of transducers are commercially available which are operative to produce an electrical signal proportional to the magnitude of such conditions as temperature, pressure, flow, humidity, and so on. In automatic control systems, computer, and data reduction systems, however, operations are most readily carried out in the digital form. Accordingly, the data reduction system of FIG. 1 is designed to convert the analog outputs of such transducers into a digital form either for recording or for immediate use in such systems.

The operation of the system of FIG. 1 is under the control of a programmer indicated by the reference character 1. The programmer comprises suitably interconnected stepping switches, decade counters, time controllers, and pulsing means connected so as to provide the sequence and storage functions necessary for system operation. The variables to be recorded are sequentially applied to the analog to digital converter of the system by an input selector 2 which may be a stepping switch, the operation of which is controlled by the programmer 1. Zero suppression for the inputs is supplied by a zero suppression circuit 3 which is shown in more detail in FIG. 2. The function of the zero suppression circuit 3 is to bias the input to a zero millivolt reference and to provide cold junction compensation for thermocouple inputs when used.

The output of the zero suppression circuit 3 is fed to an amplifier 4. The amplifier 4 amplifies the suppressed input to a known higher level. Since the amplifier 4 is out of the feedback loop of the analog to digital converter any nonlinearities or changes in its gain are direct errors. Accordingly, it is necessary that the amplifier 4 have stable gain characteristics. The exact value of the amplifier gain is of little importance since variation due to it may be calibrated out, but any drifting of the gain will cause a direct span error. The output of the amplifier 4 is applied to a digital span adjustment circuit 5. The digital span adjustment circuit 5 is shown in more detail in FIG. 3. This circuit is used to change the digital span of the analog to digital converter. Such a span adjustment is necessary where it is desired, for example, to have a span of one hundred millivolts equal to a thousand digits in one application and six hundred digits in another application.

The output of the digital span adjustment circuit 5 is fed into the input of a decision amplifier 6 together with appropriate digital zero suppression signal derived from a digital zero suppression circuit 7. The digital zero suppression circuit 7 makes it possible to shift the output of the digital span adjustment circuit 5 digitally. In other words, if it is desired to read out a one hundred millivolt signal (span adjusted to provide six hundred digits) between 400 and 1000 this circuit would be set at 400. Thus, at a zero millivolt input, the analog to digital converter would read out 400.

The analog to digital converter of the present invention comprises the decision amplifier 6, the logic circuit 8, and a digital rebalancing circuit 9. The decision amplifier 6, the logic circuit 8, and the digital rebalancing circuit 9 digitize the signal on the input of the decision amplifier 6 as adjusted by the digital span adjustment circuit 7 and the digital zero suppression circuit 7. Details of the digital zero suppression circuit 7, the logic circuit 8, and digital rebalancing circuit 9 are shown in detail in FIG. 4. The digital rebalancing circuit 9 and the logic circuit 8 together with the decision amplifier 6 form a comparison encoding system. Each of the comparisons, which are derived from the digital rebalancing circuit 9, are based on a coded percentage of the highest value which could occur when in the range of signals being measured. In order that the comparisons can be translated into digital representation of the quantity being measured, each of the comparison signals corresponds in magnitude with the successive digital positions in a decimally coded binary number system. The translation of the decimally coded binary number produced by digitally rebalancing the unknown signal is translated into decimal digits by means of the translator 11. The output of the translator 11 is fed through the programmer 1 to the typewriter 12, under the control of the programmer 1, for digital recording.

Referring now to FIG. 2, there is shown a circuit diagram of the millivolt zero suppression circuit 3. As shown, this circuit is adapted to supply four different suppressions in accordance with the position of a selector switch 14. The selector switch 14 may either be manually set or set automatically under the control of the programmer 1 in accordance with the particular input being digitized. Each of the suppression ranges is derived from a voltage divider connected in parallel across a source of constant voltage 15. A typical voltage divider indicated by the reference character 16 comprises a pair of resistors 17 and 18. The resistors 17 and 18 are proportioned with respect to the output of the constant voltage supply 15 to supply the desired suppression. If the input signal to be suppressed by the voltage divider 16 is derived from a thermocouple, the resistor 18 can be adapted to supply the necessary cold junction compensation in a manner known in the art. The output of the zero suppression circuit 3 is across a pair of output terminals 19 and 20. The output terminal 19 is connected to the junction of a pair of resistors 21 and 22 which are connected in series across the constant voltage supply 15 while the output terminal 20 is in common with the circuit input.

The suppressed signal appearing at the output terminals 19 and 20 of the millivolt suppression circuit 3 is amplified by means of an amplifier 4. By amplifying the signal to be digitized prior to making the necessary digital span and digital zero adjustments, it is possible to accomplish these adjustments by using relay contacts for the switching and without overloading the measuring circuit and thereby destroying its accuracy. As mentioned before, since the amplifier 4 is not in the feedback loop of the analog to digital converter, it is essential that the amplifier 4 have stable gain characteristics.

Figures 3, 5, 6, 7:
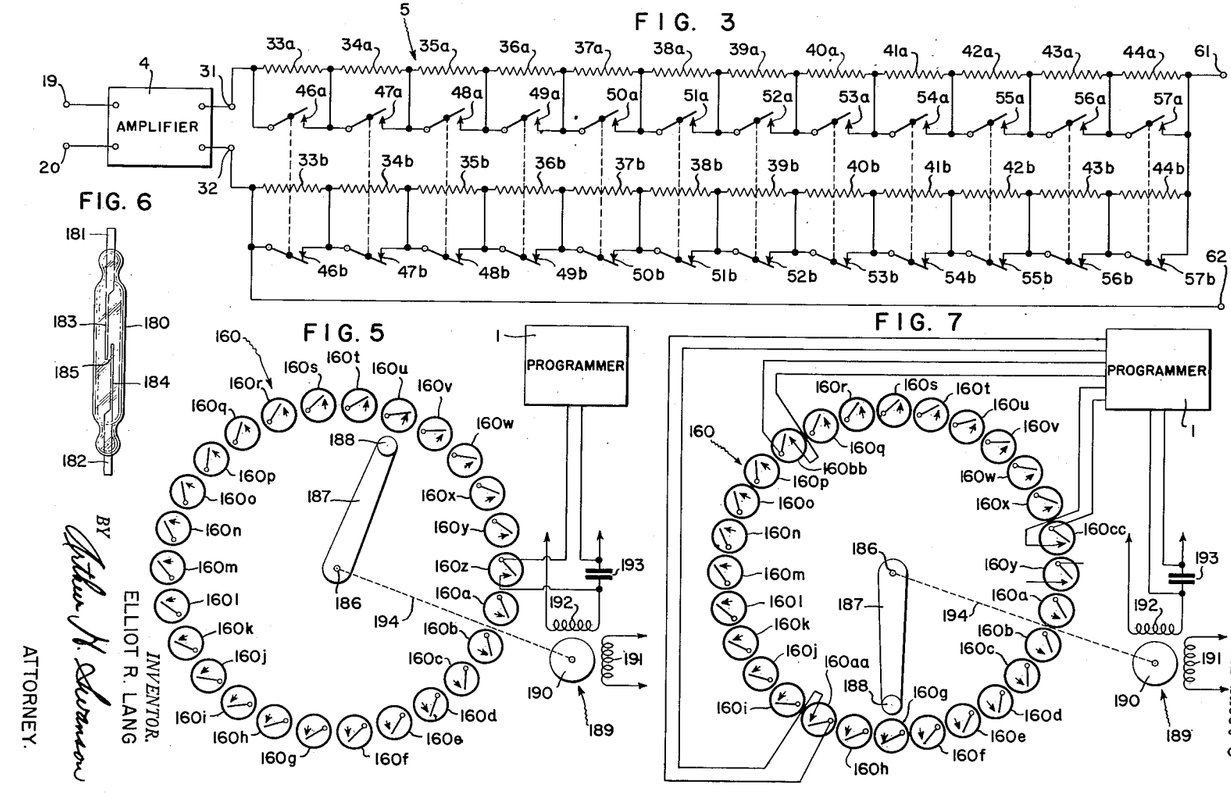
FIG. 3 is a circuit diagram of the digital span adjustment circuit shown in the system of FIG. 1.
FIG. 5 is a schematic diagram of the sequence switch employed in the logic circuit shown in FIG. 4.
FIG. 6 is a drawing of one of the sealed switches employed in the sequence switch shown in FIG. 5.
FIG. 7 is a modification of the sequence switch employed in the logic circuit of FIG. 4 which is adapted to provide certain system control operations in addition to its logical function.

The output of the amplifier 4 is applied across the input terminals 31 and 32 of the digital span adjustment circuit 5. The span adjustment circuit 5 comprises twenty-four series connected resistors designated 33a, 33b, through 44a, and 44b. Each of the resistors having an "a" suffix, is equal in magnitude to the resistor having the same numerical designation with a "b" suffix. Accordingly, the resistor 33a is equal in magnitude to the resistor 33b, the resistor 34a is equal in magnitude to the resistor 34b, and so on. Each of the resistors 33a through 44b is shunted by a relay contact, the relay contacts shunting the resistors having "a" suffixes being normally open contacts, and the relay contacts shunting the resistors having "b" suffixes being normally closed contacts. Thus, the resistor 33a is shunted by the normally open contact 46a, and the resistor 33b is shunted by the normally closed contact 44b, similarly, the resistor 34a is shunted by the normally open contact 47a, and the resistor 34b is shunted by the normally closed contact 47b, and so on. Each of the "a" and "b" relay contacts having the same numerical designation are ganged for simultaneous operation. Accordingly, the relay contacts 46a and 46b are ganged as are the relay contacts 47a and 47b and so on. As a result, upon the operation of any of the pairs of ganged contacts, the total impedance of the digital span adjustment circuit remains constant. As a "b" relay contact opens connecting into a resistor having "b" suffix, an "a" relay contact closes shorting out a resistor of an equal magnitude having an "a" suffix. The output of the digital span adjustment circuit 5 is taken across the resistors having "b" suffixes. Accordingly, an output terminal 61 is connected to the junction of the resistors 44a and 44b and an output terminal 62 is connected to and is in common with the input terminal 32.

The digital span adjustment circuit 5 is a digital voltage divider in which the resistors are graded according to a binary code. All of the digital operations in the present invention are carried out in a binary code. This is true not only as to the digital span adjustment circuit 5 but also the digital zero adjustment circuit 7 and the digital rebalancing circuit 9. The binary numbers system is particularly suited to electric or electronic circuit operation since a binary number may be expressed in terms of the opening or closing of a relay, or the conducting or non-conducting of a vacuum tube or transistor.

The word "binary" is commonly used in two senses. In one sense, "binary" means that two conditions are possible, such as, "on" or "off," a pulse or no pulse, or "1" or "0." In another sense, "binary" means a numbers system having a radix "2." As illustrated and described, the present invention employs the term "binary" in the former of the two meanings. However, it will be apparent to those skilled in the art that the present invention can be adapted to utilize a binary numbers system in which the word "binary" means a number having a radix "2." This may be done by the appropriate selection of the resistance values in the digital span adjustment circuit 5, the digital zero adjustment circuit 7, and the digital rebalancing circuit 9.

A minimum of four binary number positions are necessary to represent the ten possible values, 0–9, of a single decimal digit. Thus, eight binary number positions are necessary to represent a two digit decimal number, twelve binary number positions are necessary to represent a three digit decimal number, and so on. The four binary positions representing the ten possible values of a single decimal digit may be coded in a number of ways. For example, the positions may be chosen in the following manner: 8–4–2–1, 4–2–2–1, 5–2–1–1, 4–3–1–1. In a preferred embodiment, the present invention employs the 5–2–1–1 code. The quantity represented by each group of four relays is multiplied by 1, 10, 100, etc. so that the individual positions have weighted values as follows:

1st group of four positions:

$$100(5\text{--}2\text{--}1\text{--}1) = 500 \quad 200 \quad 100 \quad 100$$

2nd group of four positions:

$$10(5\text{--}2\text{--}1\text{--}1) = 50 \quad 20 \quad 10 \quad 10$$

3rd group of four positions:

$$1(5\text{--}2\text{--}1\text{--}1) = 5 \quad 2 \quad 1 \quad 1$$

Each of the resistors 33b through 44b is proportioned with respect to the total resistance of all of the resistors 33b through 44b in accordance with the 5–2–1–1 binary code, so that the operation of the relay contacts 46b through 57b will divide the voltage applied across the input to the span adjustment circuit 5 in accordance with that code. Similarly, the same is true of the complementary resistors 33a through 44a which serve to maintain the circuit impedance constant. Thus, the contacts 46b through 49b have weighted values of 500, 200, 100, and 100 respectively; the relay contacts 50b through 53b have weighted values of 50, 20, 10, and 10 respectively; and the relay contacts 54b through 57b have weighted values of 5, 2, 1, and 1 respectively. By way of illustration, the following table of resistance values are typical for the digital and adjustment circuit shown in FIG. 3.

| Graded Resistor | Resistance, ohms | Coded Value |
|---|---|---|
| Resistors: | | |
| 33a and 33b | 1,000 | 500 |
| 34a and 34b | 400 | 200 |
| 35a and 35b | 200 | 100 |
| 36a and 36b | 200 | 100 |
| 37a and 37b | 100 | 50 |
| 38a and 38b | 40 | 20 |
| 39a and 39b | 20 | 10 |
| 40a and 40b | 20 | 10 |
| 41a and 41b | 10 | 5 |
| 42a and 42b | 4 | 2 |
| 43a and 43b | 2 | 1 |
| 44a and 44b | 2 | 1 |

Thus, if it is desired to have a span of, say 652 digits, this can be achieved by the operation of the relay contacts 46, 48, 50, and 55. This would short out of the circuit the resistors 33a, 35a, 37a, and 42a and connect into circuit between the output terminals 61 and 62, the resistors 33b, 35b, 37b, and 42b. The operation of the ganged contacts of the digital span adjustment circuit 5 can be achieved manually or automatically actuated under the command of the programmer in accordance with the nature of the input signal being converted into a digital representation. In this latter manner, span adjustment can be provided automatically for a plurality of inputs having different spans. In selecting the values for the resistors employed in the span adjustment circuit 5 and similarly the resistors employed in the digital zero adjustment circuit 7 and the digital rebalancing circuit 9, the resistance of the smallest resistor should be large compared with the resistance of all the relay contacts in series therewith.

Figure 4:
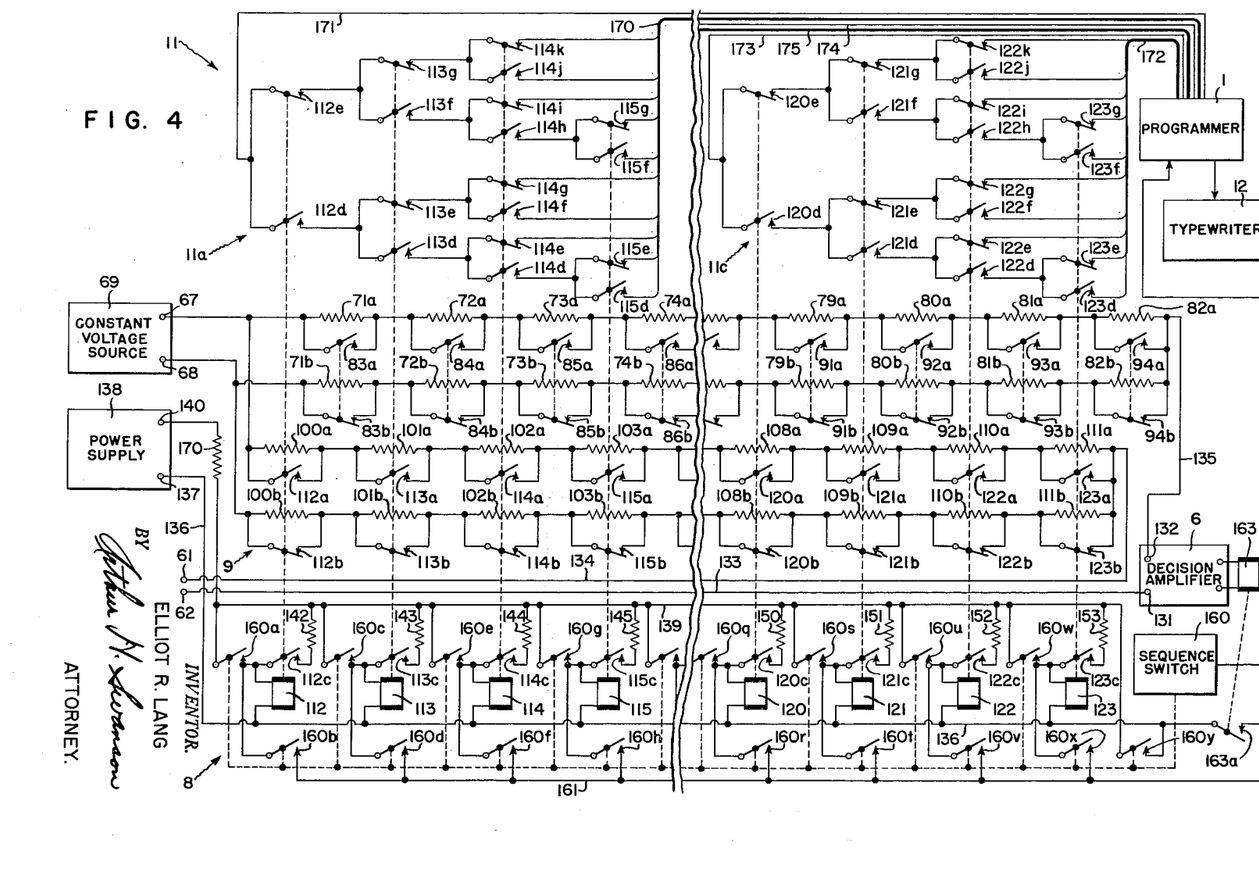
FIG. 4 is a circuit diagram of the digital balancing, the digital zero adjustment, the logic circuit, and the translator shown in FIG. 1.

Referring now to FIG. 4, there is shown a circuit diagram including the digital rebalancing circuit 9, the digital zero suppression circuit 7, the logic circuit 8, and the translator 11 shown in FIG. 1. As noted hereinbefore, the analog to digital converter of the present invention comprises the decision amplifier 6, the logic circuit 8, and the digital rebalancing circuit 9. The digital rebalancing circuit 9 and the digital zero suppression circuit 7 are connected in parallel across terminals 67 and 68 of a constant voltage supply 69. As illustrated and described, the digital rebalancing circuit 9 and the zero suppression circuit 7 are identical in construction to the digital span adjustment circuit 5 shown in FIG. 3. However, it should be understood that different resistance values could be employed in various ones of these circuits and that if it is desired, different codes can be employed in the various circuits. Thus, both comprise twenty-four series connected resistors each of which is shunted by a relay contact. For the sake of clarity, however, the drawing of FIG. 4 has been broken to eliminate the portion of the circuit operative to convert and translate the middle or tens decimal digit, which circuit portion is identical to those which are operative to convert and translate the units and hundreds digits with the exception of the values of the resistors therein. This being so, only sixteen of the twenty-four resistors comprising the digital zero adjustment circuit 7 and the digital rebalancing circuit 9 are shown in FIG. 4.

The resistors of the digital zero suppression circuit 7, shown in FIG. 4, are the resistors 71a, 71b through 74a and 74b, and the resistors 79a and 79b through resistors 82a and 82b. Each of the resistors having an "a" suffix is equal in magnitude to the resistors having the same numerical designation with a "b" suffix. Accordingly, the resistor 71a is equal in magnitude to the resistor 71b, the resistor 72a is equal in magnitude to the resistor 72b, and so on. Each of the resistors 71a through 82b is shunted by a relay contact, the contact shunting the resistors having "a" suffixes being normally open contacts and the relay contact shunting the resistors having "b" suffixes being normally closed contacts. Thus, the resistor 71a is shunted by the normally open contact 83a and the resistor 71b is shunted by the normally closed relay contact 83b, and so on. Each of the "a" and "b" relay contacts having the same numerical designation are ganged for simultaneous operation. Accordingly, the relay contacts 83a and 83b are ganged as are the relay contacts 84a and 84b and so on. As a result, upon the operation of any of the pairs of ganged contacts the impedance of the digital zero adjustment circuitry remains constant. The operation of the ganged contacts of the digital zero adjustment circuit 5 may be performed manually or automatically actuated under command of the programmer in accordance with the nature of the input signal being converted into a digital representation. The values of the resistors 71a through 82b are identical with the values of the resistors 33a through 44b of the digital span adjustment circuit 5.

Thus, the values of the resistors 71a through 82b may be as follows:

| Graded Resistor | Resistance, ohms | Coded Value |
|---|---|---|
| Resistors: | | |
| 71a and 71b | 1,000 | 500 |
| 72a and 72b | 400 | 200 |
| 73a and 73b | 200 | 100 |
| 74a and 74b | 200 | 100 |
| 75a and 75b (not shown) | 100 | 50 |
| 76a and 76b (not shown) | 40 | 20 |
| 77a and 77b (not shown) | 20 | 10 |
| 78a and 78b (not shown) | 20 | 10 |
| 79a and 79b | 10 | 5 |
| 80a and 80b | 4 | 2 |
| 81a and 81b | 2 | 1 |
| 82a and 82b | 2 | 1 |

Since these resistors have weighted values according to the 5-2-1-1 binary code, it is possible through the operation of the relay contacts 83 through 94 to provide nine hundred and ninety-nine discrete steps of zero suppression.

The resistors of the digital rebalancing circuit 9 shown in FIG. 4 are the resistors 100a, 100b, through 103a and 103b, and the resistors 108a and 108b through the resistors 111a and 111b. Again, each of the resistors having an "a" suffix is equal in magnitude to the resistor having the same numerical designation with a "b" suffix. Accordingly, the resistor 100a is equal in magnitude to the resistor 100b and the resistor 101a is equal in magnitude to the resistor 101b, and so on. Each of the resistors 100a through 123b is shunted by a relay contact, the contacts shunting the resistors having the "a" suffixes being normally opened relay contacts, and the relay contacts shunting the resistors having the "b" suffixes being normally closed contacts. Thus, the resistor 100a is shunted by the normally open contact 112a and the resistor 100b is shunted by the normally closed contact 112b and so on. Each of the "a" and "b" relay contacts having the same numerical designation are ganged for simultaneous operation. Accordingly, the relay contacts 112a and 112b are ganged as are the relay contacts 113a and 113b, and so on. As a result, upon the operation of any of the pairs of ganged contacts, the impedance of the digital rebalancing circuit remains constant.

The values of the resistors 100a through 111b are identical to the values of the corresponding resistors in the digital span adjustment circuit 5 and digital zero suppression circuit 7. Accordingly, the values of the resistors 100a through 111b may be as follows:

| Graded Resistor | Resistance, ohms | Coded Value |
| --- | --- | --- |
| Resistors: | | |
| 100a and 100b | 1,000 | 500 |
| 101a and 101b | 400 | 200 |
| 102a and 102b | 200 | 100 |
| 103a and 103b | 200 | 100 |
| 104a and 104b (not shown) | 100 | 50 |
| 105a and 105b (not shown) | 40 | 20 |
| 106a and 106b (not shown) | 20 | 10 |
| 107a and 107b (not shown) | 20 | 10 |
| 108a and 108b | 10 | 5 |
| 109a and 109b | 4 | 2 |
| 110a and 110b | 2 | 1 |
| 111a and 111b | 2 | 1 |

The relay contacts 112a, 112b, through 123a and 123b of the digital rebalancing circuit 9 are operated by relays 112 through 123 of the logic circuit 8. Each of the relays 112 through 123 has one terminal connected to the conductor 136 which is in turn connected to one terminal 137 of a power supply 138. Each of the relays 112 through 123 is also adapted upon energization to have its other terminal connected through one of its own contacts and a current limiting resistor to a conductor 139 which is in turn connected to another terminal 140 of the power supply 138. Thus, the relay 112 is connected to the conductor 139 through the relay contact 112c by means of resistor 142, the relay 113 is connected to the conductor 139 through the relay contact 113c and a resistor 143, and so on with the relay 123 being connected to the conductor 139 through the relay contacts 123c and the resistor 153. The relays 112 through 123 are adapted to be energized by being connected across the conductors 137 and 139 by the closing of alternate contacts of a sequencing switch 160.

The sequence switch 160 has two sequentially operated contacts for each signal comparison to be made, each comparison being represented by a "b" resistor on the digital rebalancing circuit 9. Since four comparisons are necessary to convert an analog signal into a decimal digit representation, and the analog to digital converter shown in FIG. 4 is operative to convert an analog signal into a three-decimal digit representation, the sequence switch 160 has twenty-four sequentially operated contacts, sixteen of which are shown in FIG. 4. Thus, the sequence switch 160 has contacts 160a and 160b associated with the relay 112, the contacts 160c and 160d associated with the relay 113, and so on, with contacts 160w and 160x being associated with the relay 123. Each of the contacts 160a, 160c, 160e, 160g, 160q, 160s, 160u, and 160w is operative when closed to energize the associated relay by connecting that relay to the conductor 139. Thus, each of these contacts is connected between the conductor 139 and one terminal of the associated relay. The contacts 160b, 160d, 160f, 160h, 160r, 160t, 160v, and 160x are each connected across the associated relay to a conductor 161. The conductor 161 is in turn connected to the conductor 136 by means of a pair of relay contacts 163a associated with a relay 163 which is operated by the decision amplifier 6. Thus, the closing of any of these contacts during the simultaneous closing of the relay contact 163a is effective to short circuit the associated relay and cause the "c" contact associated therewith to open de-energizing the relay. It should be noted that the sequential operation of the contacts of the sequence switch 160 is such that the contact 160a closes, then opens, the contact 160b closes, then opens, and so on. As indicated, the sequence switch 160 is operated under the control of the programmer 1. Details of one former sequence switch particularly adapted for use in the disclosed embodiment of the present invention are shown in FIGS. 5, 6, and 7.

Basically, the operation of the analog to digital converter of the present invention comprises first comparing the signal to be measured with a signal representing a coded percentage of the highest value that can occur within the range of signals being measured. If the first comparison signal exceeds the unknown signal, it is disregarded. If the first comparison signal is less than the unknown signal, it is accepted and subtracted from the unknown signal. At the next comparison stage, the unknown signal, or the difference between the unknown signal and the first comparison signal, is compared with a comparison signal representing a lower coded percentage of the higest value which could occur within the range of signals to be measured. This second comparison signal is accepted or rejected, depending on whether or not it exceeds or is less than the signal resulting from the first comparison. This process of comparisons is continued with each of the successive comparison voltages representing a smaller coded percentage of the highest value which could occur within the range of signals being measured.

The decision amplifier 6 controls the operation of the relay 163 upon the reversal of the polarity of the signal applied to its input. In the present invention, the unknown signal, after suitable millivolt zero suppression and digital span and zero adjustment, is applied to the input of the decision amplifier 6 in opposition to a sequence of comparison voltages derived from the constant voltage source 69 by the operation of the relay contacts of digital rebalancing circuit 9 under the control of the logic circuit 8. This circuit can be traced from the input terminal 131 of the decision amplifier 6, through the conductor 133, the output terminals 62 and 61 of the digital span adjustment circuit 5, the conductor 134, the "b" resistors of the digital rebalancing circuit 9, the "b" resistor of the digital zero suppression circuit 7, and the conductor 135 to the input terminal 132 of the decision amplifier 6. As mentioned before, the resistors of the digital rebalancing circuit 9 have magnitudes corresponding with successive digital positions in a decimally coded binary numbers system. The operation of any of the relays of the logic circuit 8 connects the associated "b" resistor in the digital rebalancing circuit 9 across the constant voltage source 69 and thereby develops a comparison voltage across the input of the decision amplifier 6 in opposition to the unknown signal. Simultaneous short-circuiting of the "a" resistor in the digital rebalancing circuit 9 maintains the load on the constant voltage source 69 constant. It should be noted, however, that if the constant voltage source 69 was replaced with a constant current source, the "a" resistors of the digital rebalancing circuit 9 could be eliminated.

Upon the closing of the first of the sequentially operated contacts 160a of the sequence switch 160, the relay 112 is energized by being connected across the conductors 139 and 136. This effectively disconnects the resistor 100a from constant voltage source 69 and connects the resistor 100b into circuit with the constant voltage source 69 thereby developing across the input of the decision amplifier 6 a comparison voltage in opposition to the signal to be measured. It should be noted that the relay 112 and the other relays of the logic circuit 8 are adapted upon energization to maintain themselves at an energizing state through the "c" contact associated therewith. Accordingly, upon the opening of the sequentially operated contact 160a, the relay 112 will remain energized. As long as the relay 112 remains energized, the comparison voltage associated therewith will be impressed upon the input of the decision amplifier 6.

Upon the closing of the next of the sequentially operated contacts 160b, the relay 112 will remain energized or be short circuited, depending upon whether or not the comparison voltage associated with the relay 112 was sufficient to change the polarity of the signal in the input of the decision amplifier 6. If the signal on the input of the decision amplifier 6 changes polarity, the comparison signal is larger than the signal being measured and the relay 163 will be energized. Upon the operation of the relay 163, the contact 163a is closed, causing a short circuit across the relay 112 which can be traced from one terminal of the relay 112 through the contact 160b, the conductor 167, through the contacts 163a, through the conductor 137, to the other terminal of the relay 112. If there is no reversal of the polarity of the signal of the input of the decision amplifier 6, the relay 112 will remain energized upon the closing of the contact 160b and the comparison voltage associated with the relay 112 will continue to be subtracted from the signal being measured.

Upon the opening of the contact 160b and the closing of the contact 160c if there was no reversal of the signal of the input of decision amplifier 6, the comparison voltage associated with the relay 113 will be added to the comparison voltage associated with the relay 113 in opposition to the unknown signal to the input of the decision amplifier 6. If there was a reversal of the polarity of the signal on the input of the decision amplifier 6, upon the closing of the contact 160c, only the comparison voltage associated with the relay 113 will be applied to the input of the decision amplifier 6 in opposition to the unknown signal. This process of comparison is continued, there being as many as may be required to digitize the signal being measured to the desired degree of accuracy.

In the embodiment of the present invention shown in FIG. 4, twelve comparisons are made, only eight of which are shown. These twelve comparisons produce a binary representation of the unknown signal which can be translated into a three-digit decimal number. Each of these comparisons is represented by a "b" resistor in the digital rebalancing circuit 9. The acceptance or rejection of each of these comparisons is indicated by the associated relay in the logic circuit remaining energized or being deenergized, respectively, after the operation of the two associated contacts of the sequence switch 160. If one indicates that a relay in the logic circuit remains energized and zero indicates that such a relay is deenergized, then, due to the weighting of the resistance values of the resistors in the digital rebalancing circuit 9 according to the aforementioned 5–2–1–1 binary code, the indication 0111, 1001, 0110 would indicate that the unknown signal has a value of (0+200+100+100)+(50+0+10)+(0+2+1+0). Thus, this signal would have an absolute value of 463.

The translator 11 is provided to translate the coded binary number indicated by the stated relays in the logic circuit 8 into a decimal representation. The translator 11 comprises a relay tree of each group of four binary number positions, each tree being composed of additional contacts of the relays 112 through 123 of the logic circuit 8. In this manner, there is a relay tree provided for each decimal digit to which the unknown signal is converted. However, it should be noted that with appropriate switching a single relay tree could be provided which could be switched in sequence to each of the groups of the four binary number positions. Since the portion of the circuit operative to convert the tens decimal digit is not shown in FIG. 4, only two of the two of the three relay trees 11a and 11c in the translator 11 are shown, those operative to translate the hundreds and units digits respectively.

The relay three 11a is comprised of a normally open contact 112d and a normally closed contact 112e of the relay 112; the normally open contacts 113d and 113f and the normally closed contacts 113e and 113g of the relay 113, the normally open contacts 114d, 114f 114h, and 114j and the normally open contacts 114e, 114g 114i, and 114k of the relay 114; and the normally open contacts 115e and 115f and the normally closed contacts 115e and 115g of the relay 115. The relay tree is formed by the interconnection of these contacts. Thus, the movable contacts of the contact pairs 112e and 112d are connected together. The stationary contact of the contact pair 112d is connected to the movable contacts of the contact pairs 113d and 113e which are connected together. Similarly, the stationary contact 112d is connected to the movable contacts of the contact pairs 113f and 113g which are connected together. The stationary contact of the contact pair 113d is connected to the movable contacts of the contact pairs 114e and 114d which are connected together. The stationary contact of the contact pair 113e is connected to the movable contacts of the contact pairs 114f and 114g which are connected together. The stationary contact of the pair 113f is connected to the movable contacts of the contact pairs 114h and 114i which are connected together. Similarly, the stationary contact of the contact pair 113e is connected to the movable contacts of the contact pairs 114j and 114k which are connected together. The stationary contact of the contact pair 114d is connected to the movable contacts of the pairs 115d and 115e which are connected together, and the stationary contact of the contact pair 114h is connected to the movable contacts of the contact pairs 115f and 115g which are connected together. In this manner, the stationary contacts of the contact pairs 114k, 114j, 114i, 115g, 115f, 114g, 114f, 114e, 115e, and 115d provide outputs which are indicative of the decimal values zero through nine respectively. Again, if one indicates the operation of a relay and zero indicates the non-operation of a relay, the translation effected by the relay tree 11a is as shown below:

| Relay 112 | Relay 113 | Relay 114 | Relay 115 | Decimal Value |
|---|---|---|---|---|
| 0 | 0 | 0 | 0 | 0 |
| 0 | 0 | 1 | 0 | 1 |
| 0 | 1 | 0 | 0 | 2 |
| 0 | 1 | 1 | 0 | 3 |
| 0 | 1 | 1 | 1 | 4 |
| 1 | 0 | 0 | 0 | 5 |
| 1 | 0 | 1 | 0 | 6 |
| 1 | 1 | 0 | 0 | 7 |
| 1 | 1 | 1 | 0 | 8 |
| 1 | 1 | 1 | 1 | 9 |

Ten outputs of the translator 11a are connected by means of a ten wire cable 170 to the programmer 1 together with conductor 171 which is connected to the movable contacts of the contact pairs 112e and 112d which constitutes the input to the tree. As indicated diagrammatically, the programmer 1 feeds the information from the translator 11a to the typewriter 12 for recording. In order to read out the information indicated by the positions of the contacts of the relay tree 11a as well as the other relay trees of the translator 11, the programmer 1 is operative to pass a pulse through these contacts when it is desired to read out their positions.

The relay tree 11c which is associated with the relays 120 through 123 of the logic circuit 8 is identical to the relay tree 11a, being made up of the contacts of the relays 120 through 123. The ten outputs of the relay tree 11c are connected to the programmer 1 by means of a ten wire cable 172. The contacts 120e and 120d which constitute the input to the translator 11c are connected to the programmer 1 by means of a conductor 173. The conductors 174 and 175 indicated in FIG. 4 represent the conductors connecting the translator for the tens decimal digit, which is not shown, to the programmer 1. In recording the output of the translator 11, the typewriter 12 is operated under control of the programmer 1 which feeds the outputs of the various relay trees in a sequence such that the hundreds digit is printed first, the tens digit printed second, and the units digit is printed third as is normal in typewriter operation. One method of achieving this printing sequence by means of the sequence switch 160 is discussed in greater detail hereinafter.

As noted before, the conversion of an unknown analog signal into a digital representation is completed upon the operation of the contact 160x of the sequence switch 160. At this time the operation of the sequence switch 160 can be stopped and the resulting value can be read out. A method for interrupting the operation of the sequence switch 160 is described hereinafter as is means for providing continuous conversion and readout. Depending upon the mode of readout employed, it may be desirable to clear the relays in the logic circuit 8 either before stopping the operation of the sequence switch 160 at the end of each conversion or at the beginning of each conversion. An additional contact 160y on the sequence switch 160 is employed to clear the relays in the logic circuit 8. To this end, the contacts 160y are connected directly across the conductors 136 and 139 and thus, when the contacts 160y are closed, they cause the voltage of the power supply 138 to be placed across the resistor 170 in the conductor 139. This reduces the voltage across the relays 112 through 123 below the point necessary to maintain them in operation and, accordingly, they are de-energized. When the contacts 160y are opened again, the circuit is cleared and ready for a new conversion.

It should be noted, that the circuitry employed in the analog to digital converter of the present invention is designed to permit the utilization of components which will provide reliable service. Still further, the circuitry employed is designed to reduce to a minimum the effect of stray signals upon the operation of the converter. To this end, the logic circuit 8 is electrically isolated from the digital rebalancing circuit 9 and from the other portions of the circuit handling the signal being measured. This being so, the relays 112 through 123 can be operated at a suitable voltage level independent of the remainder of the circuit. In addition, this avoids switching the voltage to be measured with a stepping or sequence type switching means which type of switching means is inherently poor for low level operations. As will be explained in more detail hereinafter, this also permits the sequence switching means to be utilized to perform other switching functions in addition to that of implementing the system logic and this permits the converter to make more rapid conversions.

Referring now to FIG. 5, there is shown a diagrammatic view of one form of the sequence switch 160 of the logic circuit 8. As shown, the sequence switch 160 comprises twenty-six glass sealed magnetic contacts positioned at equispaced intervals to form the circumference of a circle. These twenty-six contacts are designated 160a through 160z, the contacts 160a through 160x being the sequentially operated contacts of the logic circuit 8 shown in FIG. 4. Referring for a moment to FIG. 6, there is shown a view of one of the sealed magnetic contacts shown diagrammatically in FIG. 5. The numeral 180 designates an elongated glass envelope having heavy wire leads 181 and 182 passing through seals at both ends thereof. As shown, the leads 181 and 182 each have their inner ends flattened to form contact leaves 183 and 184 respectively. The ends of the contact leaves 183 and 184 overlap to form adjacent contact surfaces separated by a small air gap 185. The contact leaves 183 and 184 are made of highly permeable material which, when placed in a magnetic field, are drawn together to reduce the reluctance of the magnetic path between them, thus causing them to make contact with each other.

Referring again to FIG. 5, the numeral 187 designates an arm mounted for rotation about a pivot 186 located at the center of the circle formed by the glass sealed magnetic switches 160a through 160z. The arm 187 carries at its end a bar magnet 188. The arm 187 is of such a length that as it is rotated about the pivot 186, the magnet 188 passes within close proximity of the magnetic contacts 160a through 160z. As the magnet 188 approaches and becomes adjacent to one of the glass sealed magnetic contacts, its field causes the adjacent contacts to be drawn together and make contact with each other, which contact is again broken as the magnet passes on.

The arm 187 is adapted to be driven about the pivot 186 by means of the induction motor 189. The induction motor 189 comprises the rotor 190 and two phase windings 191 and 192. The rotor 190 is connected to the arm 187 by means of a gear train 194 which is indicated diagrammatically by the dash line 194. The phase winding 191 of the induction motor 189 is adapted to be connected to a suitable source of alternating current. The phase winding 192 of the induction motor 189 is adapted to be connected to the same source of alternating current through the capacitor 193. The capacitor 193 is provided to simulate the second of the two phases necessary for motor operation. As shown, the contacts 160z are connected through the programmer 1 across the capacitor 193. As a result, when the magnet 182 is adjacent to the contacts 160z these contacts will be closed, shorting out the capacitor 193 and the motor 189 will be stopped. In this manner, the programmer 1 can control the operation of the sequence switch 160 in accordance with the overall sequence of system operations by providing therein an additional pair of contacts in series with the contacts 160z of the sequence switch 160. It should be again noted, that the contact on the sequence switch 160 which is employed to clear the logic circuit can be placed either before or after the contacts employed to stop the sequence switch.

Referring now to FIG. 7, there is shown a diagrammatic view of a modification of the sequence switch 160 which is adapted to provide certain system control operations in addition to its logic function. As will be explained in more detail hereinafter, this modification permits the analog to digital converter of the present invention to make continuous and more rapid conversions. Similar reference characteristics have been employed to designate components similar to those employed in FIG. 6 and these components will not be described in detail. The sequence switch shown in FIG. 7 differs from the sequence switch shown in FIG. 6 in two major respects. First, the switch is adapted for continuous rotation in that the control of the switch driving motor 189 is carried out solely by the programmer 1. Accordingly, no contact is provided in the sequence switch itself to interrupt switch operation upon the completion of the digitizing of an unknown signal.

The sequence switch shown in FIG. 7 differs from the sequence switch shown in FIG. 6 in a second respect, namely, the addition of three extra magnetic contacts. One of these contacts is located between the contacts 160h and 160i, one is located between the contacts 160p and 160q, and the other is located between the contacts 160x and 160y. The additional contacts, which have been designated 160aa, 160bb and 160cc, are shown as being connected to the programmer. It should be noted, that the contacts 160aa are placed in the sequence switch 160 so that they are operated upon the completion of the digitizing of the one hundreds digit, that the contacts 160bb are placed in sequence switch 160 so that they are operated upon the completion of the digitizing of the tens digit, and that the contacts 160cc are placed in sequence switch 160 so that they are operated upon the completion of the digitizing of the units digit. This is done in order that these three switches can be utilized to institute the printing operation of those digits upon the completion of their digitizing in the normal sequence of system operation. In this manner, the pulsations delivered from the closure of these switches can either be used to cause the programmer 1 to initiate the printing of the digit associated with the contact or to directly initiate the printing of the associated digit.

Since the readout of the digital value of the unknown signal is completed upon the operation of the contact 160cc, the operation of the sequence switch 160 does not have to be interrupted and accordingly the relays in the logic circuit can be immediately cleared by the operation of the contact 160y. To this end, the contact 160y is placed in the sequence switch 160 between the contacts 160cc and 160a. In this manner, the analog to digital converter of the present invention is adapted to provide continuous and hence more rapid conversion of unknown signals into their digital representations. It should be noted, that this can be done due to the independence between the measuring circuits and the logic circuit which permits the addition of other contacts to the sequence switch.

Having now described the present invention, what is claimed as new and that which it is desired to secure by Letters Patent is:

1. In an apparatus for providing a digital representation of an unknown signal in which the unknown signal is successively compared with a plurality of comparison signals corresponding in magnitude with successive digital positions in a decimally coded binary number system, the combination of a first means including a first operated contact for each of said comparison signals connected to cause the subtraction of said comparison signal from said unknown signal, means responsive to the difference of said comparison signal and said unknown signal, and a second means including a second operated contact for each of said comparison signals connected in series with said responsive means for rejecting said comparison signal if the comparison signal is larger than said unknown signal, and sequencing means operating independently of the response of said means responsive to the difference of said comparison signal and said unknown signal for operating the first and second operated contacts associated with each of said comparison signals in an alternate sequence with respect to each other and in accordance with the digital positions of said decimally coded binary number systems.

2. In an apparatus for providing a digital representation of an unknown signal in which the unknown signal is successively compared with a plurality of comparison signals corresponding in magnitude with successive digital positions in a decimally coded binary number system, the combination of a first means including a first operated switch for each of said comparison signals, switching means for each of said comparison signals responsive to the operation of said first operated switch to cause the subtraction of said comparison signal from said unknown signal, means responsive to the difference of said comparison signal and said unknown signal, a second means including a second operated switch for each of said comparison signals connected in series with said responsive means for rejecting said comparison signal if the comparison signal is larger than said unknown signal, and sequencing means for operating the first and second operated contacts associated with each of said comparison signals in an alternate sequence with respect to each other and in accordance with the digital positions of said decimally coded binary number systems.

3. An analog to digital converter comprising, in combination, an amplifier adapted to receive a variable voltage signal, said amplifier also being adapted to receive a sequence of comparison voltages in opposition to said variable voltage signal, a digital rebalancing means adapted to produce said comparison voltages, polarity detecting means connected to the output of said amplifier, and logic means connected to said rebalancing means and having first switching means for each of said comparison voltages operative to connect said comparison voltage to the input of said amplifier in opposition to said variable voltage, second switching means for each of said comparison voltages each connected in series with said polarity detecting means to disconnect said comparison voltage from the input of said amplifier if the comparison voltage caused the total of the comparison voltages applied to the input of said amplifier to exceed said variable voltage and sequencing means comprising said first switching, said second switching means and switch actuating means, said first and said second switching means being positioned alternately with respect to a switch actuating operation of said actuating means for alternately operating said first switching means and said second switching means associated with each of said comparison voltages in a predetermined sequence.

4. An analog to digital converter operative to convert a direct current analog signal into a digital representation comprising, in combination, direct current suppression means operative to suppress the analog signal to a known reference level, an amplifier connected to the output of said suppression means and operative to amplify the suppressed analog signal to a known level, digital span adjustment means connected to the output of said amplifier and operative to supply variable digital span adjustment, a second amplifier connected to the output of said digital span adjustment circuit, digital zero suppression means and digital rebalancing means connected to the input of said second amplifier in opposition to the output of said digital span adjustment circuit, said digital zero suppression circuit being operative to supply variable digital zero suppression, said digital rebalancing means being adapted to produce a sequence of comparison voltages, polarity detecting means connected to the output of said amplifier, and logic means connected to said rebalancing means having first switching means for each of said comparison voltages operative to connect said comparison voltages to the input of said amplifier in opposition to said variable voltage and a second switching means for each of said comparison voltages operative in association with said polarity detecting means to disconnect said comparison voltage from the input of said amplifier if the comparison voltage caused the total of the comparison voltages applied to the input of said second amplifier to exceed said variable voltage.

5. Apparatus as specified in claim 4 wherein said digital span adjustment means, said digital zero suppression means, and said digital rebalancing means each comprise identical resistance networks comprising a plurality of series connected resistors each proportioned in accordance with the total resistance of the network according to a binary code.

6. Apparatus as specified in claim 4 wherein said digital rebalancing means and said digital zero suppression means are both energized from a common constant voltage supply.

7. An analog to digital converter operative to convert a direct current analog signal into a digital representation comprising, in combination, direct current zero suppression means operative to suppress the analog signal to a known reference level, an amplifier connected to the output of said zero suppression means and operative to amplify the suppressed analog signal to a known reference level, digital span adjustment means connected to the output of said amplifier and operative to supply variable digital span adjustment, a second amplifier connected to the output of said digital span adjustment means, digital rebalancing means connected to the input of said second amplifier in opposition to the output of said digital span adjustment means for applying a sequence of comparison voltages thereto having magnitudes proportioned in accordance with a binary number system, sequencing means connected to said digital rebalancing means to cause said comparison voltages to be applied to said amplifier input in a predetermined sequence, polarity detecting means connected to the output of said second amplifier and to said sequencing means to cause the removal of the last applied comparison voltage if this magnitude was sufficient to change the polarity of the combined signal applied to the input of said second amplifier.

8. An analog to digital converter operative to convert a direct current analog signal into a digital representation comprising, in combination, direct current suppression means operative to suppress the analog signal to a known reference level, an amplifier connected to the output of said suppression means and operative to amplify the suppressed analog signal to a known level, digital span adjustment means connected to the output of said amplifier and operative to supply variable digital span adjustment, a second amplifier connected to the output of said digital span adjustment circuit, digital zero suppression means and digital rebalancing means connected to the input of said amplifier in opposition to the output of said digital span adjustment circuit, said digital zero suppression circuit being operative to supply variable digital zero suppression, said digital rebalancing means being adapted to produce a sequence of comparison voltages, polarity detecting means connected to the output of said amplifier, logic means connected to said rebalancing means having first switching means for each of said comparison voltages operative to connect said comparison voltages to the input of said amplifier in opposition to said variable voltage, a second switching means for each of said comparison voltages operative in association with said polarity detecting means to disconnect said comparison voltage from the input of said amplifier if the comparison voltage caused the total of the comparison voltages applied to the input of said amplifier to exceed said variable voltage, and sequencing means for alternately operating the first and second switching means associated with each of said comparison signals in sequence in accordance with the digital positions of said decimally coded binary number systems.

9. Apparatus as specified in claim 8 wherein the first and second switching means for each of said comparison voltages each comprise a glass sealed magnetic contact, the switching means for all of said comparison voltages being positioned in a circle and adapted to be operated by a magnet moved in a path adjacent to and concentric with the circle formed by the sealed contacts.

10. In an apparatus for providing digital representation of an unknown signal in which the unknown signal is successively compared with a plurality of comparison signals corresponding in magnitude with successive digtial positions in a decimally coded binary number system, a combination of a first glass sealed magnetically operated contact for each of said comparison signals, a relay for each of said comparison signals responsive to the operation of said first operated magnetic contact to cause the subtraction of the associated comparison signal from said unknown signal, means responsive to the difference of said comparison signal and said unknown signal, and a second operated glass sealed magnetic contact for each of said comparison signals, connected in series with said responsive means, for rejecting said comparison signal if said comparison signal caused the total of the comparison signals applied to the input of said responsive means to exceed said unknown signal, the first and second magnetic contacts for each of said comparison signals being positioned alternately about a circle, and magnetic means adapted to move in a path near to and concentric with the circle formed by the sealed contacts to cause the successive operation of said contacts.

11. An analog to digital converter comprising, in combination, an amplifier adapted to receive a variable voltage signal, said amplifier also being adapted to receive a sequence of comparison voltages in opposition to said variable voltage signal, a plurality of resistors having values graded according to a decimally coded binary number system, a constant voltage supply, a relay connected to the output of said amplifier, and a logic circuit adapted to connect said resistors to said constant voltage supply to produce said comparison voltages, said logic circuit comprising for each of said comparison signals a first operated magnetic switch operative to connect the associated graded resistor into circuit with the constant voltage supply, a second operated magnetic switch connected in series with said relay, for disconnecting said graded resistor from circuit with said constant voltage supply if the connection of said graded resistor to said constant voltage supply caused the total of the comparison signals applied to the input of said amplifier to exceed said unknown signal, and magnetic means for alternately operating the said first and second operated switches associated with each of said comparison voltages in a predetermined sequence said first magnetic switch and said second magnetic switch for each of said comparison signals being positioned alternately in a predetermined sequence with respect to a switch actuating operation of said magnetic means.

12. In an apparatus for providing a digital representation of the magnitude of an unknown signal comprising, in combination, an amplifier having an input and an output, a relay connected to the output of said amplifier and adapted for operation upon a reversal of the polarity of the signal applied to the input of said amplifier, means for connecting said unknown signal to the input of said amplifier, a rebalancing circuit connected to the input of said amplifier comprising a constant voltage supply and a plurality of graded resistors adapted to be sequentially connected in circuit with said constant voltage supply to develop across the input of said amplifier a sequence of comparison signals in opposition to said unknown signal, each of said comparison signals corresponding in magnitude with successive digital positions in a decimally coded binary number system, there being four comparison signals for each decimal digit in which the unknown signal is to be represented, two successively operated contacts for each of said comparison signals, the first of said contacts being adapted to connect the associated graded resistor in circuit with said constant voltage supply, the second of said contacts being adapted to disconnect the associated graded resistor from circuit with said constant voltage supply if the comparison signal developed across the input of said amplifier by the operation of said first contact caused the operation of said relay, translating means connected to said rebalancing circuit to provide decimal readout means for said unknown signal, sequencing means for alternately operating the first and second contacts associated with each of said comparison signals in a sequence in accordance with the digital positions of said decimally coded binary number system, said sequencing means including means to initiate the readout of the digital representation of said unknown signal upon the completion of each of the four comparisons necessary for providing each decimal digit representation of the unknown signal.

References Cited in the file of this patent
UNITED STATES PATENTS

| | | |
|---|---|---|
| 2,466,803 | Giffen | Apr. 12, 1949 |
| 2,550,605 | Schenck | Apr. 24, 1951 |
| 2,611,051 | Kolff | Sept. 16, 1952 |
| 2,736,006 | Langevin et al. | Feb. 21, 1956 |
| 2,754,503 | Forbes | July 10, 1956 |
| 2,762,038 | Lubkin | Sept. 4, 1956 |
| 2,775,754 | Sink | Dec. 25, 1956 |
| 2,836,356 | Forrest et al. | May 27, 1958 |

OTHER REFERENCES

Journal of Assoc. Computing Machinery, January 1954, pp. 36–43.